US006837344B2

(12) United States Patent
Miller et al.

(10) Patent No.: US 6,837,344 B2
(45) Date of Patent: Jan. 4, 2005

(54) PISTON AND ROD ASSEMBLY FOR AIR-ACTUATED VARIABLE DAMPING

(75) Inventors: Troy A. Miller, York, PA (US); Michael L. Oliver, Xenia, OH (US); William C. Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/044,615

(22) Filed: Jan. 11, 2002

(65) Prior Publication Data

US 2002/0108826 A1 Aug. 15, 2002

Related U.S. Application Data

(63) Continuation-in-part of application No. 09/781,868, filed on Feb. 12, 2001.

(51) Int. Cl.[7] .................................................. F16F 9/34
(52) U.S. Cl. ........................ 188/322.15; 188/322.22; 188/266.2; 188/282.3; 188/282.6; 188/282.8
(58) Field of Search ........................... 188/298, 322.15, 188/322.22, 281, 322.13, 280, 317, 318, 266.1, 266.2, 266.5, 269, 282.3, 282.5, 282.6, 282.8, 313, 316, 319.1, 322.14, 322.19, 299.1, 282.1, 282.4

(56) References Cited

U.S. PATENT DOCUMENTS

| | | | |
|---|---|---|---|
| 4,478,431 A | 10/1984 | Muller et al. | |
| 4,589,528 A | 5/1986 | Axthammer et al. | |
| 4,683,992 A | 8/1987 | Watanabe | |
| 4,834,088 A | 5/1989 | Jeanson | |
| 5,038,897 A * | 8/1991 | Wells et al. | 188/282.1 |
| 5,207,300 A * | 5/1993 | Engel et al. | 188/266.2 |
| 5,392,885 A | 2/1995 | Patzenhauer et al. | |
| 5,505,281 A * | 4/1996 | Lee | 188/299.1 |
| 5,533,596 A | 7/1996 | Patzenhauer et al. | |
| 5,690,195 A * | 11/1997 | Kruckemeyer et al. | 188/282.5 |
| 5,706,919 A | 1/1998 | Kruckemeyer et al. | |
| 5,725,239 A * | 3/1998 | de Molina | 280/5.503 |
| 5,924,528 A * | 7/1999 | Vermolen et al. | 188/266.1 |
| 6,161,662 A | 12/2000 | Johnston et al. | |
| 6,305,512 B1 * | 10/2001 | Heinz et al. | 188/299.1 |

FOREIGN PATENT DOCUMENTS

| | | |
|---|---|---|
| FR | 2449236 | 9/1980 |
| JP | 1038008 | 10/1998 |

* cited by examiner

*Primary Examiner*—Robert A. Siconolfi
*Assistant Examiner*—Devon Kramer
(74) *Attorney, Agent, or Firm*—Michael D. Smith

(57) ABSTRACT

A damper includes a piston that carries a relatively compact control valve for controlling fluid flow through the piston. The control valve provides a variable amount of damping by regulating damper fluid flow between the extension chamber and the compression chamber of the damper during extension and compression strokes. Pressure regulation across the piston is controlled through a flow path as determined by the control valve. The damping force of the damper varies depending upon the loading conditions of the vehicle. The control valve is air pressure actuated to adjust the damping force and control the flow of fluid in the flow path. The piston and rod assembly include unique features such as a seal plate design, and spring retainer that aid in the efficient and reliable assembly in a commercial production setting.

14 Claims, 6 Drawing Sheets

PISTON AND ROD ASSEMBLY FOR AIR-ACTUATED VARIABLE DAMPING

This is a continuation-in-part of U.S. patent application Ser. No. 09/781,868, filed Feb. 12, 2001, and hereby incorporated by reference in its entirety.

BACKGROUND OF THE INVENTION

This invention relates generally to a valved damper and more particularly, to a damper that is pneumatically controlled to provide variable damping forces.

Conventional vehicle suspension dampers typically consist of direct double-acting telescopic hydraulic passive dampers. They are generally described as either shock absorbers or struts. A primary purpose of shock absorbers is to dampen oscillations of the vehicle suspension spring. This is accomplished by converting kinetic energy in the form of motion between sprung and unsprung masses of a vehicle into heat and then dissipating the heat. Struts also serve this capacity and in addition, support reaction and side-load forces on the suspension.

Typical dampers are hydraulic devices using oil as the fluid medium for converting motion into heat. As the damper is cycled, a piston is forced to move in extension and compression directions through the oil that is contained within a cylinder tube. This creates pressure within a portion of the cylinder tube and a consequent pressure drop across the piston. During an extension stroke, high pressure is created in the extension chamber of the cylinder tube above the piston, forcing oil to flow through the valving of the piston. During a compression stroke, high pressure is created in the compression chamber of the cylinder tube below the piston, forcing oil to flow back through the piston's valving.

As oil is forced to flow through the orifices in the piston a pressure drop is effected and the oil is heated. In this way, the damper dissipates energy stored by the vehicle's suspension springs. The extent to which the oil is heated and consequently, the amount of energy dissipated is controlled by the size of the orifices in the piston and the amount of flow forced through the piston valving.

Damping force is a common measurement of the performance of a damper. It is used to quantify the amount of spring control provided by a damper. Passive dampers are tuned to provide selected vehicle performance characteristics. Because passive dampers provide a set damping characteristic they are generally somewhat of a compromise in providing optimum damping performance over a wide range of operating conditions.

The concept of dampers with an electrically controlled damping force has been developed in the art wherein an algorithm is used to provide a control mechanism as a means of varying the damping force provided by a damper. One example is shown in U.S. Pat. No. 5,690,195 hereby incorporated by reference. Electrical control is typically achieved by varying the valving orifices in response to various sensors which are used to detect vehicle operating conditions. Such dampers adjust the damping force in response to the control mechanism so that various performance characteristics can be provided by an individual damper. An electrically controllable orifice however, provides less than ideal levels of control at low flow rates.

Electrically controlled hydraulic dampers for vehicle suspensions have, in principle, been known in the art for some time. However, their actual widespread application and use have been tempered because of the expense of such a system.

One solution to these and other problems with prior art systems is disclosed in U.S. patent application Ser. No. 09/781,868, assigned to the assignee of this invention. The damper in accordance with a preferred embodiment of that invention includes a cylinder slidably carrying a piston which separates the cylinder into extension and compression chambers. The piston carries a control valve for controlling fluid flow through the piston. The control valve provides a variable amount of damping force by regulating damper fluid flow between the extension chamber and the compression chamber of the damper during extension and compression strokes. Pressure regulation across the piston is controlled through a primary and a secondary flow path in which the flow through the secondary flow path or branch is determined by the control valve. The primary flow path or branch remains open.

The flow passage through the piston includes a secondary flow path or second branch that communicates through ports in the control valve, and flow therethrough is alternately interrupted, completely or partially, as determined by the control mechanism or valve. When flow through the second branch is interrupted by the control valve, the flow passage through the piston extends only through the first branch which includes the first passive valve individually.

That invention includes a hydraulic damper that uses pneumatic control of the control valve to vary damping levels. Air pressure from an air-suspension or air-leveling system of the vehicle is vented in a presently preferred embodiment of this invention to a bellows or air-pressure actuated control valve located in the piston. The bellows or control valve compresses in response to higher pressure from the air-suspension or air-leveling system. The compression of the bellows control valve controls the position of a spool valve and as the spool valve is closed, one of two parallel flow paths through the piston is closed. Each flow path has its own valving. When only one of the flow paths is open, a higher damping force is generated. As a result, a continuously variable damper provides varied damping force according to the vehicle payload and operating conditions.

The pneumatic control of the damper uses the air pressure of the vehicle's air-suspension or air-leveling systems to control the position of the spool valve. The air pressure input to the control valve varies according to the overall vehicle weight as well as the road conditions. As the damper is stroked due to road input, the pressure varies. Higher frequency pressure oscillations resulting from road input are filtered with an orifice mounted inside a hollow piston rod in an attempt to limit damper variation to only static vehicle weight. The resulting air pressure is used as an input to the bellows or air-actuated control valve. A higher vehicle payload will result in higher pressure surrounding the bellows resulting in contraction of the bellows. As the bellows contracts or compresses, the secondary flow path is blocked by the spool valve. A higher pressure surrounding the bellows will result in the bottom face of the bellows lifting and the spool valve and thereby shutting off the secondary flow path. The pneumatic system is isolated from the piston hydraulic system with seals that are held in place with a seal plate, seal retainer and piston adapter.

While the piston and rod assembly of the invention disclosed in U.S. patent application Ser. No. 09/781,868 is a significant advance, such systems should preferably be easy to manufacture and assemble while still providing a robust and reliable damper for use in commercial production of vehicles. Factors such as ease of manufacturing and assembly as well as reliable and maintenance free construction design often are the difference between a successful or an unsuccessful commercial implementation of a unique invention such as the damper disclosed in the above-identified patent application.

SUMMARY OF THE INVENTION

This invention solves the above-described and other problems associated with known systems by providing a damper with variable damping fluid flow control in a preferred monotube design. This is accomplished through variable state pressure regulation in a valved damper piston. A damper according to presently preferred embodiments of this invention is more easily and reliably manufactured and assembled into a robust damper for implementation in a commercial production environment.

In presently preferred embodiments of this invention, a piston assembly includes unique and advantageous alternatives for connecting the piston to the output rod, piston seal plate and spring retainer configurations, and joinder mechanisms for the piston to the valve support. Each aspect of this invention offers significant manufacturing and reliability advantages and can be implemented individually or in various combinations.

Several alternatives are available according to this invention to connect the output rod to the piston adapter. This connection must both (1) be able to withstand fluid and mechanical forces and (2) seal the fluid outside of the piston from the gas inside the piston. A first embodiment is particularly useful where the output rod has a sufficient diameter for a shoulder to be included thereon. A tapered seat between the output rod and the piston adapter aligns the two pieces, seals between them, and provides a surface to oppose the tension of a threaded connection between the two components. Another embodiment involves resistance-welding the output rod to the piston adapter. This also provides a leak-tight, strong joint. Another alternative includes a snap ring to accomplish the alignment and strength functions, while a thread sealant provides the sealing function.

Another feature unique to the present invention is a stepped seal plate which ensures that the plate will be assembled in the proper orientation. If the plate is installed upside down, the incorrect assembly is easily identified. If not visually identified by the assembler, however, the piston adapter would not be able to crimp to the valve support, ensuring that the faulty product will be noticed.

The crimping of the piston adapter to the valve support is also a design feature of this invention that is desirable for mass production. It replaces a thread joint utilized in other damper designs.

A further feature of the present invention is a spring retainer that is pressed into the end of the valve support. After final assembly of the piston, a single deforming process is used to ensure that both the spring retainer as well as the piston nut remain secure through the life of the damper.

BRIEF DESCRIPTION OF THE DRAWINGS

The objectives and features of the invention will become more readily apparent from the following detailed description taken in conjunction with the accompanying drawings in which.

DETAILED DESCRIPTION OF THE PRESENTLY PREFERRED EMBODIMENT

Figure 1:
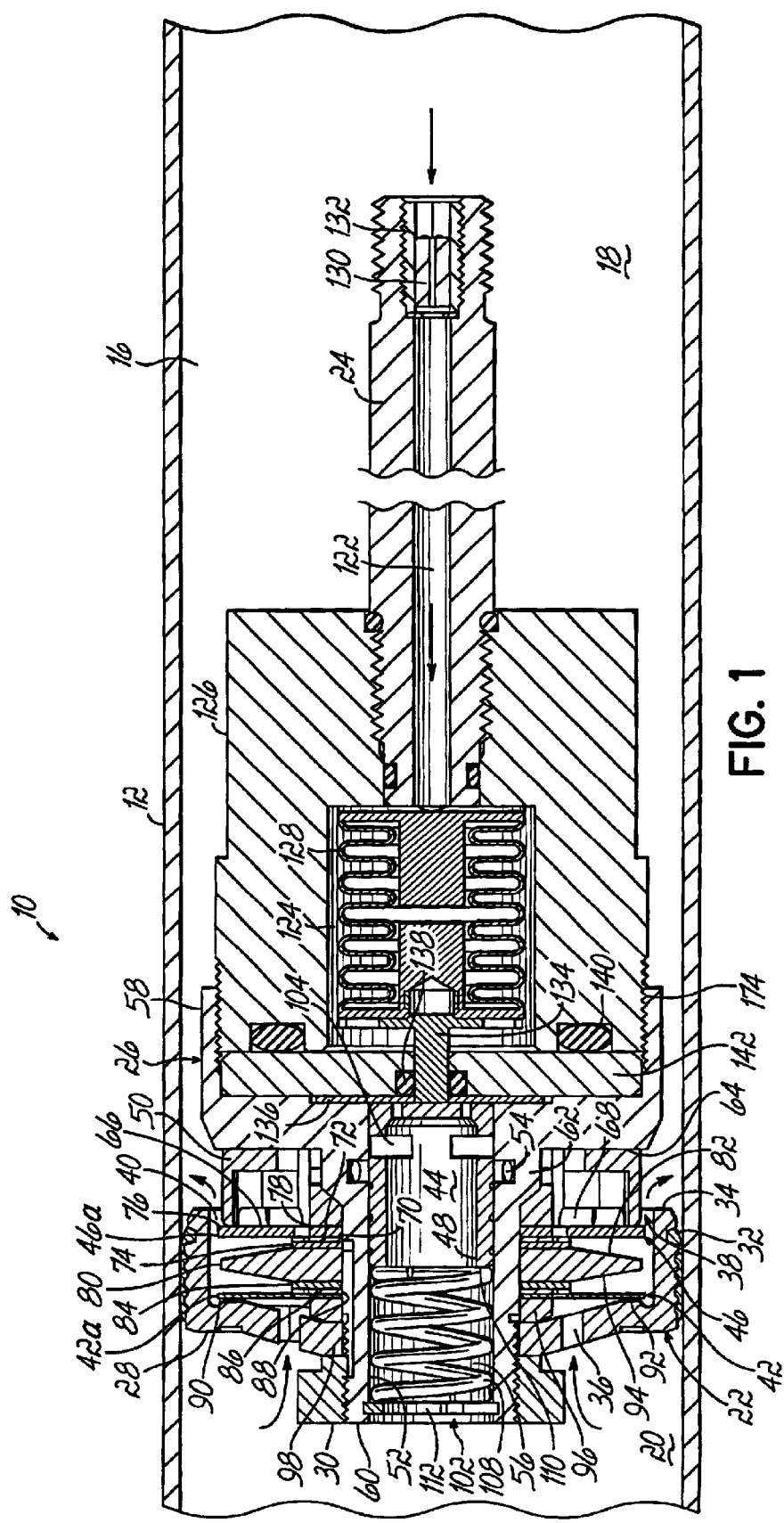
FIG. 1 is a fragmentary cross sectional view of a presently preferred embodiment of a damper according to this invention with a control valve in a closed position.
Figure 2:
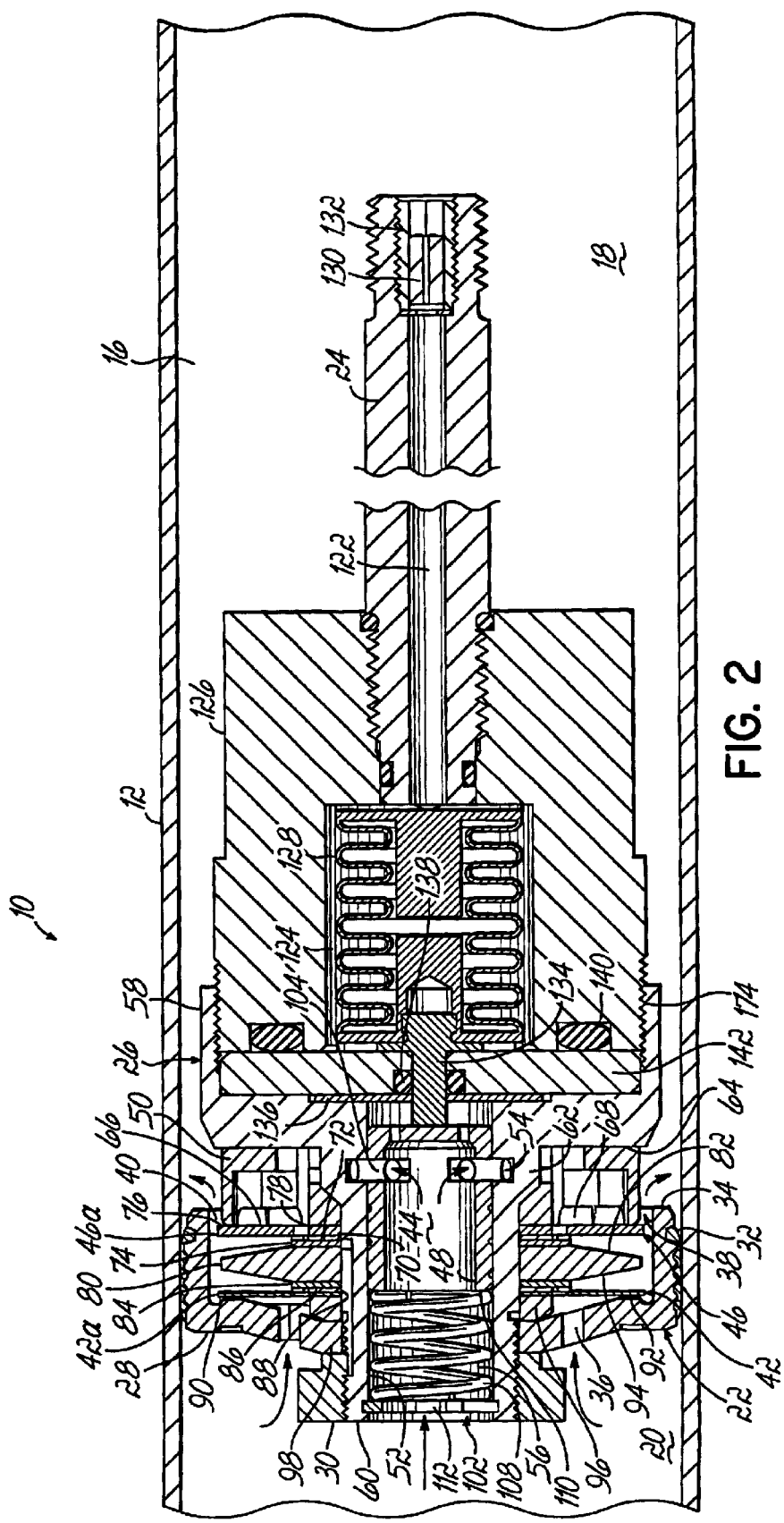
FIG. 2 is a view of the piston assembly of FIG. 1 with the control valve in an open position.

Referring to the drawings, illustrated in FIGS. 1 and 2 is an alternating state pressure regulation valved monotube suspension damper embodied as a shock absorber 10 according to a presently preferred embodiment of this invention. The vehicle suspension damper or shock absorber 10 includes a single tube designated as cylinder 12. Cylinder 12 has a closed lower end (not illustrated), and an upper end closed by a rod guide (not illustrated), in a conventional manner defining cylindrical cavity 16. Cavity 16 is divided into an extension chamber 18 and a compression chamber 20 by a piston assembly 22. Piston assembly 22 is sealingly disposed in cylinder 12 for slidable axial movement therein.

Securely connected to piston assembly 22 is piston rod 24 which extends through the extension chamber 18 of the cylinder tube 12 exiting the cavity 16 through the rod guide. The upper end of the piston rod 24 is adapted for connection to the sprung mass (body), of the motor vehicle (not illustrated), in a conventional manner. A similar means of attachment is provided at the lower end (not illustrated), of cylinder 12 for connection to the unsprung mass (wheel assembly), of the vehicle in a conventional manner. Relative movement between the sprung and unsprung masses of the vehicle, to which shock absorber 10 is connectable, produces relative axial sliding movement of the piston assembly 22 within the cylinder 12.

The piston assembly 22 includes a control valve assembly 26 that is carried on the bottom of the rod 24 and is connected therewith by mating threads. A piston cup 28 is mounted on the control valve assembly 26 and is fixed thereon by a threaded nut 30. The piston cup 28 includes a seal ring 32 made of low friction material. Seal ring 32 sealingly bears against the cylinder 12 providing fluid separation between the compression chamber 20 and the extension chamber 18.

The piston cup 28 spans between the control valve assembly 26 and the cylinder 12 opening at its top to the extension chamber 18 within the rim 34. Piston cup 28 is provided with a plurality of openings 36 which open the interior of the piston cup 28 to the compression chamber 20. Therefore, a flow passage 38 is provided through the piston assembly 22 between the compression chamber 20 and the extension chamber 18. The flow passage 38, and more specifically a first or primary branch 40 thereof, is normally closed by the first or primary valve assembly 42. A second or secondary branch 44 of the flow passage 38 extends through a spool valve 48 of the control valve assembly 26 and the second valve assembly 46 in parallel to the branch 40.

More specifically, a valve plate 50 is positioned on the control valve partially within the piston cup 28 and supports the primary valve 42 in the form of a bi-directional, deflectable, single annular valve disc 42a. A second bi-directional, deflectable, single annular valve disc 46a is supported by the piston cup 28. The spool valve 48 is carried within the control valve assembly 26 in central bore 52 and operates to selectively provide the flow path 44 between the openings 54 and 56 through the control valve assembly 26. Accordingly, during compression or extension travel of the piston assembly 22 within the cylinder 12 fluid flow between the extension chamber 18 and the compression chamber 20 can be through either of two branches 40 and 44 through the flow passage 38 across the piston assembly 22.

When the spool valve 48 is in the open position as shown in FIG. 2, fluid flow travels through the primary valve assembly 42, deflecting the disc 42a if pressure differentials dictate, and through the spool valve 48 and secondary valve assembly 46 deflecting disc 46a providing one level of damping typically for lighter vehicle loading conditions. This effects a first pressure drop for fluid travel across the piston assembly 22 providing a first degree of pressure regulation for a first state of operation of the shock absorber 10. When the spool valve 48 is moved to its closed position (see FIG. 1), fluid flow between the extension chamber 18 and the compression chamber 20 travels solely through primary valve assembly 42 deflecting disc 42a providing another level of damping typically for heavy vehicle loading. This effects a second pressure drop for fluid travel across the piston assembly 22 providing a second degree of pressure regulation for a second state of operation of the shock absorber 10.

For more specificity, additional reference is directed to FIG. 2, along with FIG. 1. The control valve assembly 26 includes housing 58 and substantially cylindrical body 60. The second flow path of branch 44 is effected through the control valve assembly 26 between the openings 54 provided in the side of cylindrical body 60 and the opening 56 provided in the end of cylindrical body 60 at the bottom of piston assembly 22. The spool valve 48 is active during operation of the shock absorber 10, in-that, it is selectively positioned so that an open, intermediate or closed flow path 44 is provided between the openings 54 and 56.

The piston cup 28 is received on the cylindrical body 60 of the control valve assembly 26 and fixed thereon by the nut 30 thereby additionally carrying the various passive valving components of the piston assembly 22. Valve assemblies 42 and 46 of the piston assembly 22 are passive, in-that they respond only by deflection upon the presence of fluid pressure differentials at various stages across the piston assembly 22.

The juncture between the cylindrical body 60 and the housing 58 of the control valve assembly 26 includes an annular shoulder 62. A plurality of radially extending openings 54 are formed through the cylindrical body 60 at the annular shoulder 62 intersecting the central bore 52. The spool valve assembly 48 opens and closes the openings 54 to the central bore 52.

A valve plate 50 is positioned over the cylindrical body 60 receiving the annular shoulder 62 within counterbore 64 and bearing against the housing 58. An annular groove 66 is formed in the valve plate 50. A number of openings 68 extend through the valve plate 50 providing a passage between the openings 54 and the annular groove 66. Therefore, when the spool control valve 48 is open, the secondary branch 44 of passage 38 is open through the central bore 52, openings 54 and openings 68 to the annular groove 66.

Valve assembly 46 includes the valve disc 46a that is received over the cylindrical body 60 of control valve assembly 26 against the valve plate 50. The valve disc 46a includes an inner circumference 70 that is spaced away from the cylindrical body 60. A center disc 72 is received over the cylindrical body 60 within the inner circumference 70. The center disc 72 includes a plurality of arms (not shown) that extend radially outward and operate to maintain the valve disc 46a in an operable position.

A support disc 74 is positioned over the cylindrical body 60 adjacent the valve disc 46a and center disc 72. The support disc 74 includes a number of notches (not shown) formed around its outer perimeter. The arms (not shown) remaining between each pair of these adjacent notches provide a bearing surface for the inner periphery 70 of the valve disc 46a. The outer periphery 76 of the valve disc 46a bears against an annular rib 78 of the valve plate 50. The annular groove 66 spans radially across a portion of the center disc 72 and the valve disc 46a. The valve disc 46a as positioned by the center disc 72 on the cylindrical body 60, is biased between the arms at the outer periphery of the support disc 74 and the annular rib 78 of the valve plate 50.

An annular stop plate 80 is positioned over the cylindrical body 60 of control valve assembly 26 engaging the secondary valve assembly 46 and maintaining the components thereof in axial position. The stop plate 80 includes an angled annular wall 82. The annular wall 82 provides a stop for valve disc 46a when it is deflected. The annular wall 82 is oriented such that when the valve disc 46a is fully deflected during extension travel of the shock absorber 10, with its inner circumference 70 supported on the support disc 74, the valve disc 46a is positioned against the annular wall 82.

The primary passive valve assembly 42 including support disc 84, center disc 86 and valve disc 42a is received over the cylindrical body 60 of control valve 26 adjacent the stop plate 80. The support disc 84 includes a plurality of arms (not shown) like the arms of support disc 74. The center disc 86 includes a plurality of arms (not shown) like the arms of center disc 72. The valve disc 42a is supported at its inner circumference 88 by the support disc 84 and at its outer periphery 90 by annular ledge 92 of piston cup 28. The valve disc 42a normally closes off the openings 36 through the piston cup 28. When the valve disc 42a is fully deflected during compression travel of the shock absorber 10, with its inner circumference 88 supported on support disc 86, the valve disc 42a is positioned flat against the angled annular wall 94 of stop plate 80.

A main spacer 96 is positioned against valve disc 42a bearing against the annular leg 98 of piston cup 28 with the nut 30 applying a fixed bias to the annular leg 98 maintaining the piston cup 28, the first and second valve assemblies 42, 46 and the valve plate 50 in position on the cylindrical extension 60 of control valve assembly 26. This applies a preload to the valve discs 46a and 42a in a predetermined manner to selectively effect the damping performance produced by their deflecting characteristics.

The control valve assembly 26 includes the cylindrical body 60 and housing 58. The spool valve 48 is received within the valve cylinder body 60 and coacts therewith to provide a means of opening and closing the secondary branch 44. The spool valve 48 includes a series of openings 104 registering with the openings 54 in the cylindrical body 60 to provide the second branch 44 passageway through the spool valve 48. When the spool valve 48 is in an open position (FIG. 2), the openings 104 and 54 register with each other. Depending upon the position of the spool valve 48, intermediate or partially opened positions may be provided when the openings 104 and 54 are only partially in register.

To close the spool valve 48, the openings 104 are placed out of registry with the openings 54, blocking off fluid flow through the second branch 44 of the control valve 26 by movement of the spool valve 48 rearwardly.

The present embodiment describes a normally open spool valve 48. When preferable, a closed valve 48 is provided by simply moving the axial location of the openings 104 out of registry with the openings 54. The spool valve 48 is biased toward the open position by a spring 108. The end 110 of the spool valve 48 is also open and receives the spring 108 that is engaged with snap ring 112 at piston assembly 22 at open end 102 and biases the spool valve 48 into the open position. The opening through the end 110 provides fluid balancing on opposed sides of the spool valve 48 to preempt the formation of opposing fluid forces across the spool valve 48.

The spool valve 48 is adjusted to and between the open, intermediate and closed positions pneumatically by an air pressure input generated in an air suspension or air leveling system 116 of the vehicle. Air pressure from the air suspension or air leveling system 116 of the vehicle is supplied to the end of the piston rod 24. This air pressure input to the suspension damper or shock absorber 10 is a function of the overall vehicle weight 118 as well as the road input or operating conditions 120 for the vehicle. The piston rod 24 is hollow and includes a generally cylindrical bore or channel 122 through which the air pressure input is delivered to a central chamber 124 within a piston adapter 126. A bellows or other expansible member 128 is located within the chamber 124 and is responsive to the air pressure input delivered thereto through the bore 122 in the piston rod 24. The piston rod 24 includes an orifice insert 130 seated within a sleeve 132 to filter or segregate out higher frequency pressure oscillations resulting typically from road input 120. As a result, the air pressure input received by the bellows 128 is primarily a static pressure resulting from changes in the vehicle weight 118. The higher the vehicle's payload, the higher pressure input value is experienced by the bellows 128. This results in a higher pressure surrounding the bellows 128 in the chamber 124. The greater the air pressure input in the chamber 124 surrounding the bellows 128 will result in contraction of the bellows 128.

The bellows 128 is coupled to a T-shaped push rod 134 which projects from the piston adapter 126 through a seal retainer 136 into contact with the spool valve 48. The spool valve is held against the push rod 134 by the spool spring 108 which his retained within the valve support cylinder body 60 by the snap ring 112.

The spool spring 108 biases the spool valve 48 and push rod 134 against the bellows 128. Therefore, as the bellows 128 compresses in response to higher air pressure input values, the push rod 134 face contacting the bellows 128 lifts and the spool valve 48 moves thereby shutting off the secondary branch 44 of the flow passage 38. The pneumatic portion of the air damper or shock absorber 10 is isolated from the hydraulic components with seals 138, 140 that are held in place against the seal plate 142, seal retainer 136 and piston adapter 126.

The air pressure input initially must overcome a bias or preload force of the spring 108 before the bellows 128 will move the spool valve 48. Thus, low air pressure input values will not cause a change in the bellows 128 and the spool valve 48 remains open. Both the primary and secondary branches 40, 44 are then open providing parallel hydraulic fluid flow paths. When spool valve 48 is open, damping forces are optimized for normal driving conditions when the vehicle is not heavily loaded. Therefore, in the case of a pressure supply failure, the vehicle will still drive optimally when it is not heavily loaded. This is a result of the spool valve 48 being biased toward the open position.

Figure 4:
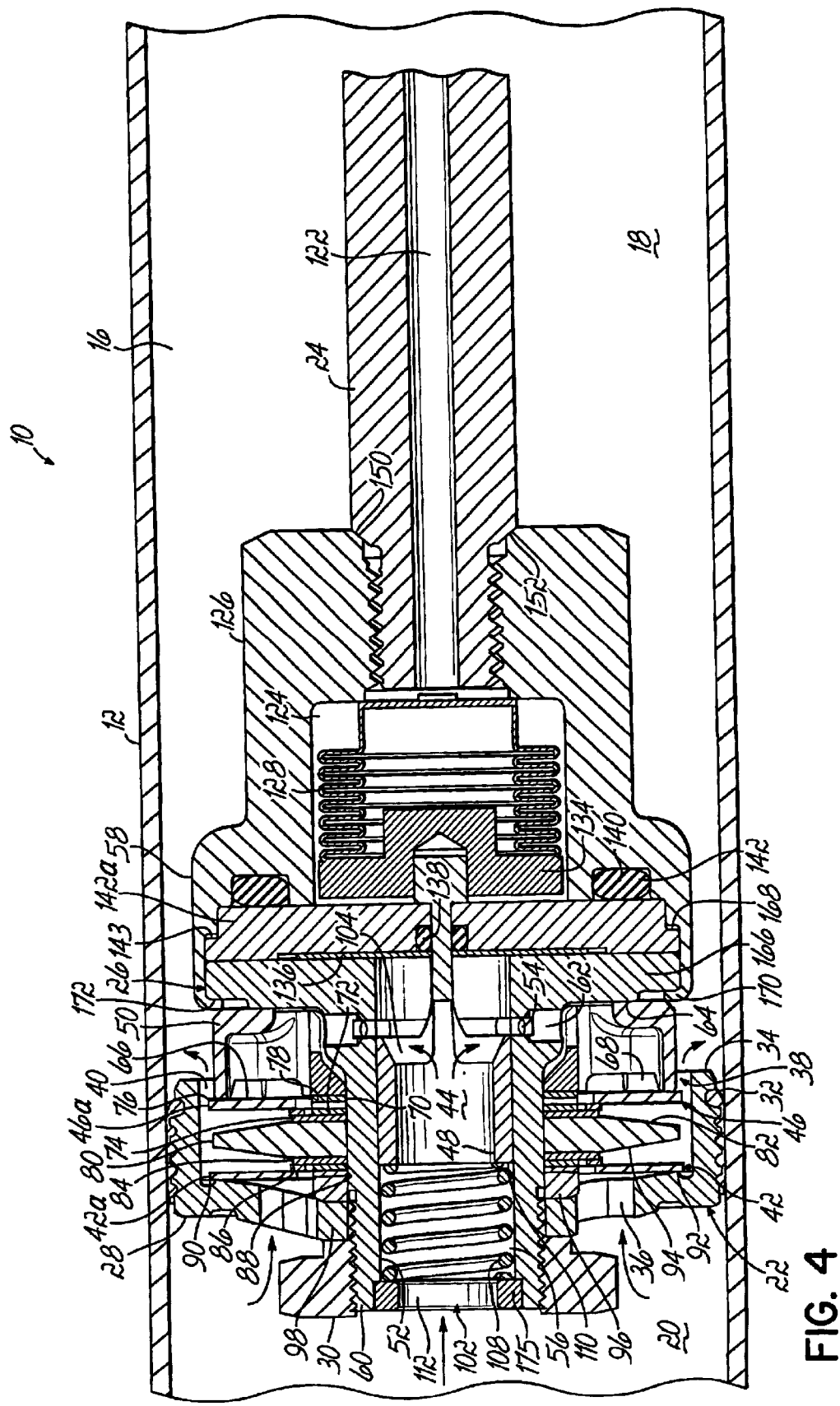
FIG. 4 is a cross-sectional view of a first alternative embodiment of a piston assembly according to this invention.

When the vehicle is heavily loaded, the air pressure input reaching the bellows 128 is also higher thereby causing the bellows 128 to compress, the spool valve 48 to move toward the closed position and the overall damping forces to be higher as shown in FIG. 4. At intermediate payloads, the spool valve 48 will be partially moved toward the closed position and the secondary branch 44 of the flow path 38 is partially blocked resulting in intermediate damping forces. As a result, the damper 10 is continuously variable over a given pressure range as shown in FIG. 4. The performance of the system can be tuned by changing the valving, bellows, spool spring, bellows compression preload or the orifice insert as desired.

Figure 3:
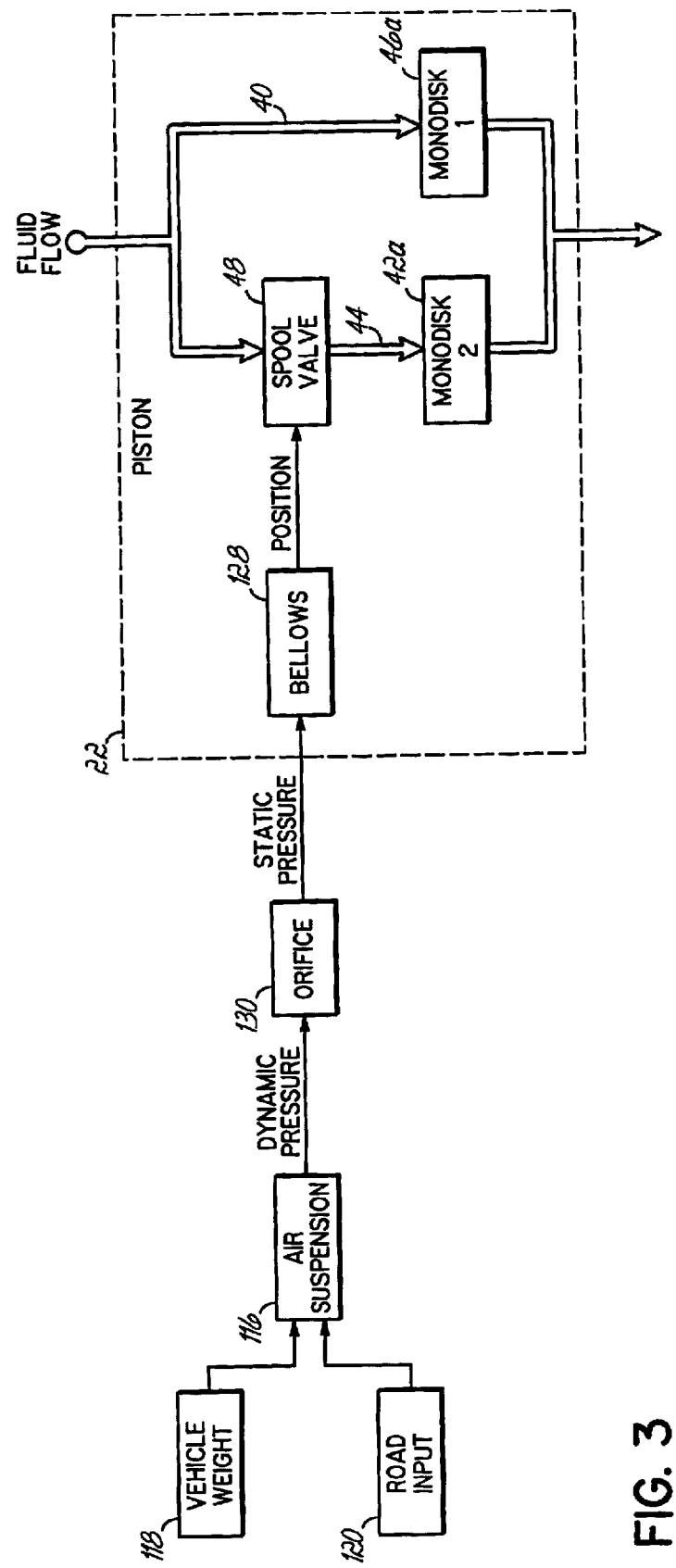
FIG. 3 is a schematic block diagram of the operation of the damper of FIG. 1.

Referring to FIG. 3, the operation of the hydraulic and pneumatic portions of the damper 10 according to a presently preferred embodiment of this invention is shown schematically. Vehicle weight 118 and road input 120 variables are determined by the air suspension or air leveling system 116 of the vehicle. The resulting dynamic pressure is then delivered to the orifice 130 in the rod 24 which then filters the higher frequency air input values as desired. The static pressure input is then transmitted through the piston rod 24 to the bellows 128 which adjusts a position of the spool valve 48 to and between the open, intermediate and closed positions. Depending upon the position of the spool valve 48, the hydraulic fluid may flow through the passage 38 in the primary or first branch 44 and the second branch provided that the spool valve 48 is at least partially opened.

During a compression stroke of the piston assembly 22 when the spool valve 48 is in an open position, fluid flow is permitted through opening 56 in the bottom of cylindrical extension 60 of control valve assembly 26. Fluid passes through the spool valve 48 and the openings 54 and 68 to the annular groove 66. This defines part of the branch 44 of the flow passage 38 through the piston assembly 22. In the annular groove 66, the fluid applies pressure to the valve disc 46a which, in relation to the pressure applied thereto, deflects at its outer periphery 76 with the inner circumference 70 remaining supported on the support disc 74.

Deflection of the valve disc 46a opens a flow passage between the outer periphery 76 thereof, and annular leg 78 of valve plate 50, permitting fluid flow through the piston assembly 22 from the compression chamber 20 to the extension chamber 18 and vice versa. The valve disc 46a effects a pressure drop as the fluid flows through the piston assembly 22 which results in a damping effect for the travel of piston assembly 22 within cylinder 12.

During compression travel of the piston assembly 22 fluid pressure is also applied to the valve disc 42a. The valve disc 46a is designed to deflect under lower loading and therefore, the valve disc 42a remains substantially undeflected under low load conditions. However, since the valve discs 46a and 42a are arranged in parallel in the flow passage 38 with the spool valve 48 open, a sufficiently high pressure differential across the piston assembly 22 will cause both valve discs 42a and 46a to open.

When the spool valve 48 is closed, the flow path through the branch 44 of the flow passage 38 through the piston assembly 22 is closed. Therefore, during compression and extension strokes of the piston assembly 22 within the cylinder 12, fluid must flow through the branch 40. During a compression stroke of the piston assembly 22, when the spool valve 48 is closed, a fluid pressure effected in compression chamber 20 is communicated through the piston 22.

Within the piston assembly 22, the fluid is open to the extension chamber 18. Therefore, fluid is permitted to flow from the compression chamber 20 to the extension chamber 18 through the branch 40 of flow passage 38 deflecting the valve disc 42a. This results in a pressure drop for fluid flow through the passage 38 across the piston assembly.

During an extension stroke of the piston assembly 22 within the cylinder 12 with the spool valve 48 closed, a pressure increase effected in extension chamber 18 is applied to the valve disc 42a and fluid flow travels through branch 40 of flow passage 38.

During extension of the shock absorber 10, as fluid flows through the branch 40 of passage 38 through the piston assembly 22 deflecting valve disc 42a, a pressure drop occurs which effects the damping performance. The developed damping force resulting from a given velocity for the travel of piston assembly 22 within the cylinder 12 is significantly greater for the single valve disc 42a then for the parallel combination of an open or partially open spool valve 48 and valve disc 46.

A first alternative preferred embodiment of the suspension damper or shock absorber 10 is shown in FIG. 4. Like reference numerals are used in the alternative embodiments of FIGS. 4–6 for components or features of the invention that are similar to those shown in FIGS. 1 and 2. In FIG. 4, the shock absorber 10 includes an output or piston rod 24 having a central bore 122 therethrough for communication of the air pressure. The rod 24 is coupled to the piston adapter 126 in an advantageous manner so that the connection will withstand both the fluid and mechanical forces associated with the mechanism as well as seal fluid outside the piston 22 from the gas inside the piston 22. The rod 24 includes an annular shoulder 150 at a juncture with the piston adapter 126 to provide a tapered interface between the rod 24 and the piston 22. An annular seat 152 is provided at the interface on the piston adapter 126. Advantageously, the tapered interface at the juncture between the shoulder 150 and the annular seat 152 aligns the rod 24 relative to the piston adapter 126 and likewise provides a seal that is fluid tight. The rod 24 is also threaded into the piston adapter 126.

Figure 5:
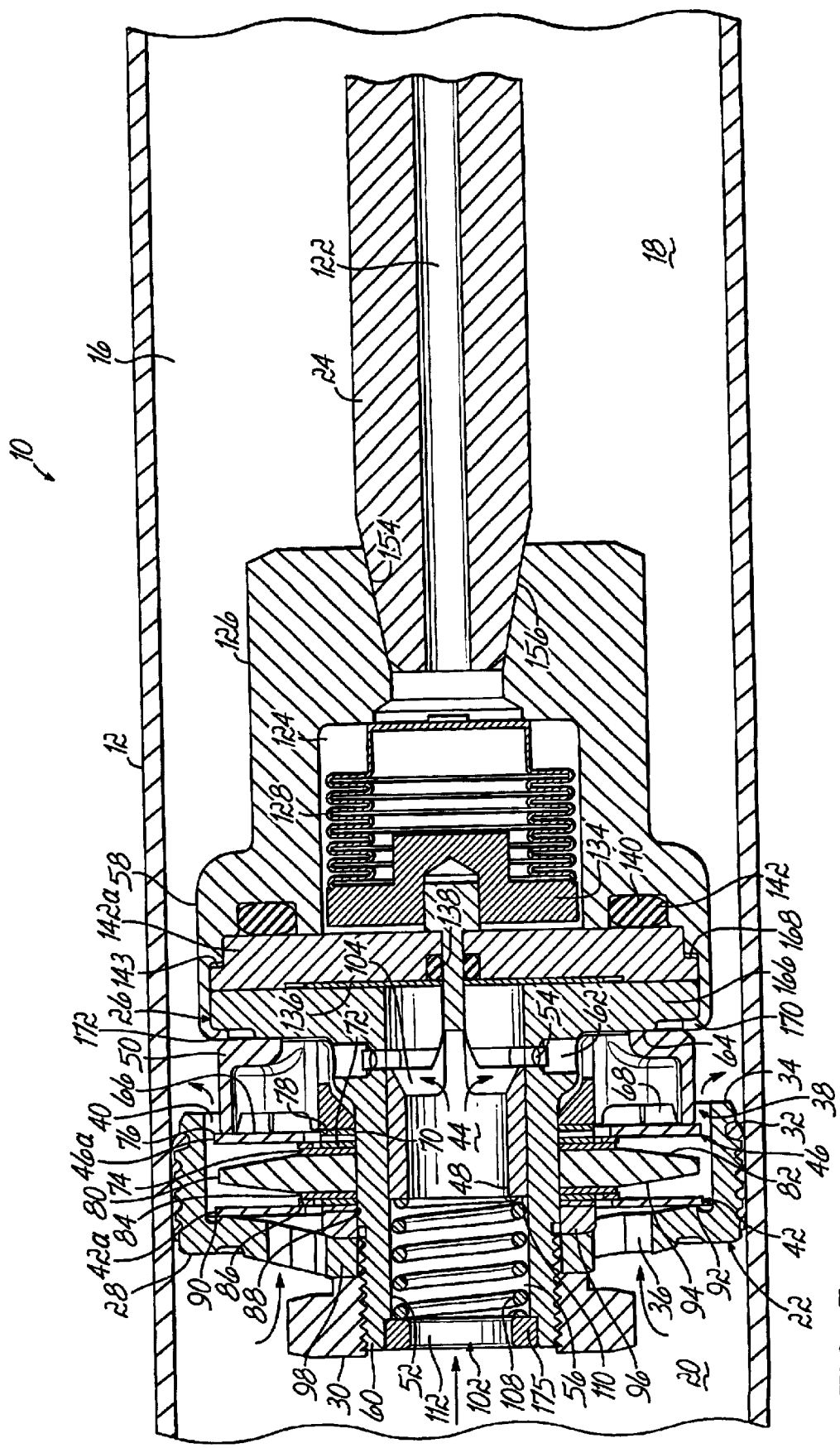
FIG. 5 is a cross-sectional view of a second alternative embodiment of a piston assembly according to this invention.

A further alternative embodiment is shown in FIG. 5 in which the rod 24 is resistance-welded along an interface between a conical surface 154 of the rod 24 and a tapered seat 156 on the piston adapter 126.

Figure 6:
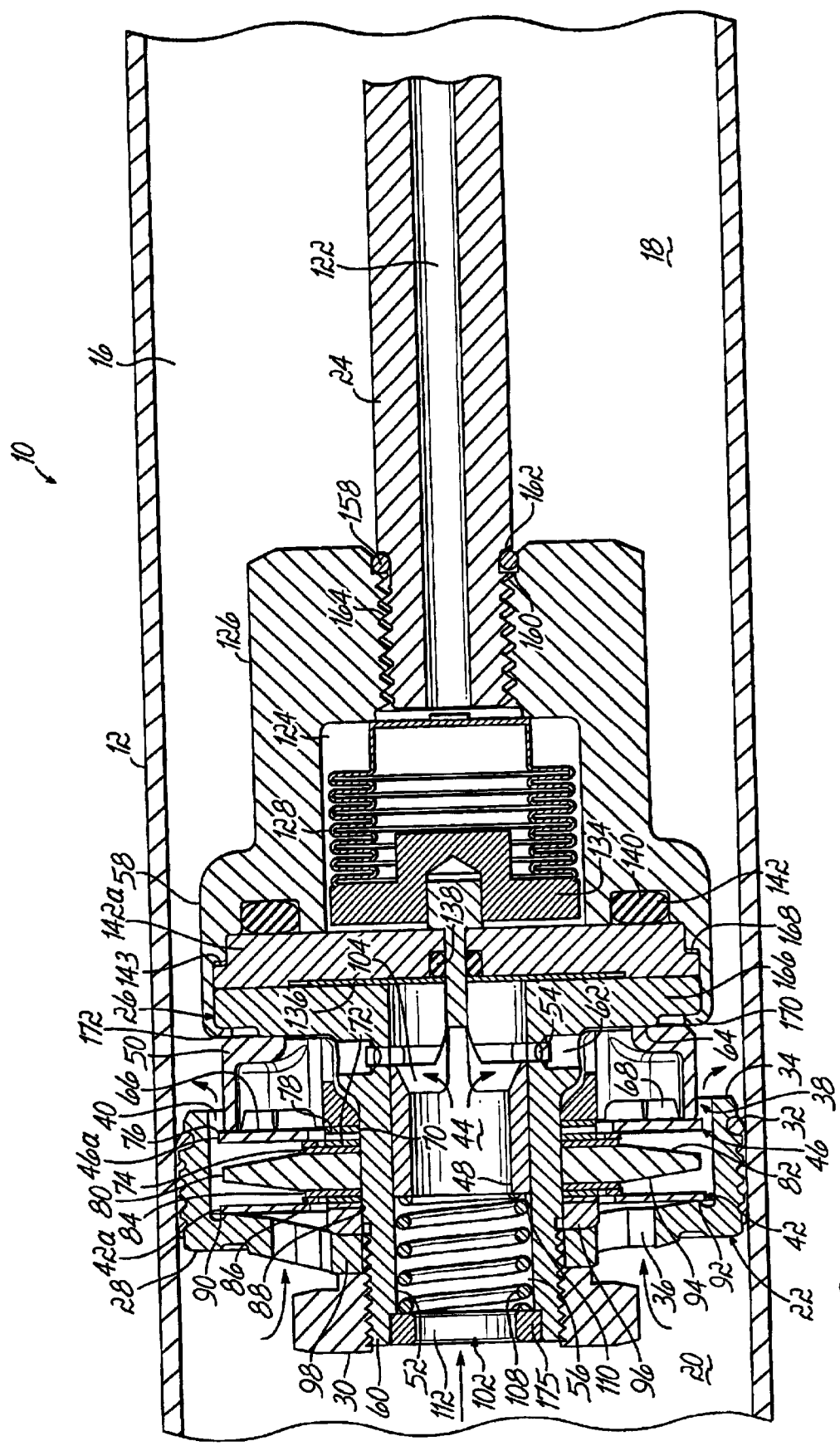
FIG. 6 is a cross-sectional view of a third alternative embodiment of a piston assembly according to this invention.

A still further alternative embodiment is shown in FIG. 6 in which a snap ring 158 is provided at the juncture between the piston adapter 126 and the rod 24. The snap ring is seated in an annular groove 160 on the piston adapter 126 and at a shoulder 162 on the rod 24. The snap ring 158 aligns the two components relative to one another as well as adding strength to the juncture. A thread sealant 164 is added at the threaded coupling between the piston adapter 126 and the rod 24 to provide a fluid tight seal at the juncture.

Referring to FIGS. 4–6, a still further feature of an alternative preferred embodiment is shown in which a modified seal plate 142a includes an annular step 143 around a perimeter thereof. The seal plate 142a is juxtaposed to the seal retainer 136. The seal retainer 136 is sandwiched between the seal plate 142a and a valve support member 166 as shown in FIGS. 4–6. Advantageously, the seal plate 142a can be seated in only one orientation in the piston adapter 126 so that the step portion 143 mates with an interior annular shelf 168 in the piston adapter 126. This arrangement ensures that the seal plate 142a will be assembled in the proper orientation as shown in FIGS. 4–6. If the seal plate 142a is inserted incorrectly, such as upside down, it will not mate with the shelf 168 on the piston adapter 126. If the seal plate 142a is installed upside down, the incorrect arrangement will be visually obvious to the assembler. However, if the assembler does not identify the improper positioning of the seal plate 142a, further assembly of the suspension dampener 10 will not be possible as described below.

A still further feature of an alternative embodiment of this invention is an annular lip 170 on the piston adapter 126. The annular lip 170 is crimped or bent around a flange 172 on the valve support 166. This is a design feature that is particularly desirable for mass production and replaces a threaded joint 174 as shown in FIGS. 1–2. Moreover, if the seal plate 142a is installed incorrectly, the flange 172 on the valve support 166, as well as the seal plate 142a, will not be properly seated in the piston adapter 126 and the annular lip 170 cannot be crimped around the flange.

A still further feature of an alternative presently preferred embodiment of this invention is also shown in FIGS. 4–6 and is a spring retainer 175 seated in a cylindrical body portion 60 of the valve support 166. The spring retainer is pressed into the end of the cylindrical portion 60 of the valve support 166. After final assembly, the terminal edge of the cylindrical portion 60 can be deformed in a single process to ensure that both the spring retainer 175, as well as the piston nut 30, remain securely installed during the life of the suspension damper 10 to confine the spring 108.

These and other advantageous improvement of the suspension damper 10 allow for more reliable, accurate, consistent and efficient mass production of the suspension damper 10 according to the various embodiments of this invention.

Through means of the foregoing structure a compact manner of regulating pressure by controlling the pressure drop as fluid flows from one side of the piston assembly 22 to the other is provided. The pressure drop is modified by a pneumatic input signal communicated to the control valve assembly 26, moving it between open, intermediate and closed positions. This selectively varies the relative damping force effected by the piston assembly 22, between the body and wheel of a vehicle to which the shock absorber 10 is assembled. Since the control valve assembly 26 is carried with the piston assembly 22 instead of within the rod 24, the rod diameter can remain relatively small for a damper with an internal valve. The relatively small rod size minimizes the amount of volumetric compensation required for fluid displacement resulting in reduced overall size requirements of the piston assembly 22 within the shock absorber 10. This tends to maximize the applications within which the shock absorber 10 can be utilized. The flow path 38 through the piston assembly 22, remains relatively direct for all variable states of the pressure regulation.

From the above disclosure of the general principles of the present invention and the preceding detailed description of at least one preferred embodiment, those skilled in the art will readily comprehend the various modifications to which this invention is susceptible. Therefore, we desire to be limited only by the scope of the following claims and equivalents thereof.

We claim:

1. A suspension damper comprising:
   a cylinder defining a cavity being substantially filled with a fluid;

a piston slidably positioned in the cylinder separating the cavity into a compression chamber and an extension chamber;

a rod coupled to the piston and extending through one of the chambers and exiting the cavity;

a tapered interface between the rod and the piston to thereby align the rod relative to the piston;

a passage through which the fluid moves between the extension chamber and the compression chamber during sliding of the piston in the cylinder; and an air pressure actuated control valve assembly responsive to an air pressure input for adjustment to and to maintain either an open position, a closed position, or at least one position intermediate the open and closed positions to control the movement of fluid in the passage between the extension and compression chambers;

wherein a damping force of the suspension damper is a function of the air pressure input;

wherein the tapered interface provides a fluid tight seal.

2. The suspension damper of claim 1 wherein the tapered interface further comprises:

a shoulder on a portion of the rod; and a confronting surface on a portion of the piston proximate the shoulder.

3. A suspension system for a vehicle comprising:

a pneumatic suspension sub-system selected from at least one of the following: a vehicle air-suspension system and a vehicle air-leveling system, the pneumatic suspension sub-system generating an air pressure value as a function of a weight of the vehicle and a condition of the road on which the vehicle travels;

at least one damper comprising:

(a) a cylinder defining a cavity being substantially filled with a fluid;

(b) a piston slidably positioned in the cylinder separating the cavity into a compression chamber and an extension chamber;

(c) a rod coupled to the piston and extending through one of the chambers and exiting the cavity;

(d) an interface between the rod and the piston to thereby provide a fluid tight seal;

(e) a passage through which the fluid moves between the extension chamber and the compression chamber during sliding of the piston in the cylinder; and (f) an air pressure actuated control valve assembly responsive to an air pressure input for adjustment to and to maintain either an open position, a closed position, or at least one position between the open and closed positions to control the movement of fluid in the passage between the extension and compression chambers;

wherein a damping force of the suspension damper is a function of the air pressure input.

4. The suspension system of claim 3 wherein the interface between the rod and the piston further comprises:

a tapered interface region between the rod and the piston to thereby align the rod relative to the piston and provide the fluid tight seal.

5. The suspension system of claim 4 wherein the tapered interface region further comprises:

a shoulder on a portion of the rod; and a confronting surface on a portion of the piston proximate the shoulder.

6. The suspension system of claim 3 wherein the interface between the rod and the piston further comprises:

a resistance weld between the rod and the piston.

7. A suspension damper comprising:

a cylinder defining a cavity being substantially filled with a fluid;

a piston assembly slidably positioned in the cylinder separating the cavity into a compression chamber and an extension chamber;

a rod coupled to the piston assembly and extending through one of the chambers and exiting the cavity;

a passage through which the fluid moves between the extension chamber and the compression chamber during sliding of the piston assembly in the cylinder;

an air pressure actuated control valve assembly responsive to an air pressure input for adjustment to and to maintain either an open position, a closed position, or at least one position intermediate the open and closed positions to control the movement of fluid in the passage between the extension and compression chambers;

wherein a damping force of the suspension damper is a function of the air pressure input; and a uni-directional seal plate mounted in the piston assembly and in communication with the air pressure actuated control valve assembly;

wherein the uni-directional seal plate is adapted for mounting in the piston assembly in a predetermined orientation.

8. The damper of claim 7 wherein the uni-directional seal plate further comprises:

a step extending around a perimeter thereof.

9. A suspension damper comprising:

a cylinder defining a cavity being substantially filled with a fluid;

a piston assembly slidably positioned in the cylinder separating the cavity into a compression chamber and an extension chamber;

a rod coupled to the piston assembly and extending through one of the chambers and exiting the cavity;

a passage through which the fluid moves between the extension chamber and the compression chamber during sliding of the piston assembly in the cylinder;

an air pressure actuated control valve assembly responsive to an air pressure input for adjustment to and between a plurality of positions to control the movement of fluid in the passage between the extension and compression chambers;

wherein a damping farce of the suspension damper is a function of the air pressure input; and a uni-directional seal plate mounted in the piston assembly and in communication with the air pressure actuated control valve assembly;

wherein the uni-directional seal plate is adapted far mounting in the piston assembly in a predetermined orientation and includes a step extending around a perimeter thereof;

wherein the piston assembly includes a piston adapter having an annular lip crimped onto the step of the uni-directional seal plate.

10. A suspension damper comprising:

a cylinder defining a cavity being substantially filled with a fluid;

a piston assembly slidably positioned in the cylinder separating the cavity into a compression chamber and an extension chamber;

a rod coupled to the piston assembly and extending through one of the chambers and exiting the cavity;

a passage through which the fluid moves between the extension chamber and the compression chamber during sliding of the piston assembly in the cylinder;

an air pressure actuated control valve assembly responsive to an air pressure input for adjustment to and between a plurality of positions to control the movement of fluid in the passage between the extension and compression chambers;

wherein a damping force of the suspension damper is a function of the air pressure;

a piston adapter having an annular lip crimped onto a portion of the air pressure actuated control valve assembly.

11. A suspension damper comprising:

a cylinder defining a cavity being substantially filled with a fluid;

a piston assembly slidably positioned in the cylinder separating the cavity into a compression chamber and an extension chamber;

a rod coupled to the piston assembly and extending through one of the chambers and exiting the cavity;

a passage through which the fluid moves between the extension chamber and the compression chamber during sliding of the piston assembly in the cylinder;

an air pressure actuated control valve assembly responsive to an air pressure input for adjustment to and between a plurality of positions to control the movement of fluid in the passage between the extension and compression chambers;

wherein a damping force of the suspension damper is a function of the air pressure;

a biasing member urging the air pressure actuated control valve assembly toward a closed position;

a retainer coupled to the biasing member to thereby secure the retainer relative ta the biasing member.

12. The suspension damper of claim 11 wherein the biasing member is a spring.

13. The suspension damper of claim 11 wherein a portion of the suspension damper is deformed during assembly thereof to capture the retainer.

14. A suspension damper comprising:

a cylinder defining a cavity being substantially filled with a fluid;

a piston slidably positioned in the cylinder separating the cavity into a compression chamber end an extension chamber;

a rod coupled to the piston and extending through one of the chambers and exiting the cavity;

a tapered interface between the rod and the piston to thereby align the rod relative to the piston, the tapered interface comprising a frustoconical section formed on an outer surface of the rod and having an axis of revolution extending along a direction parallel to a longitudinal axis of the rod;

a passage through which the fluid moves between the extension chamber and the compression chamber during sliding of the piston in the cylinder; and an air pressure actuated control valve assembly responsive to an air pressure input for adjustment to and between a plurality of positions to control the movement of fluid in the passage between the extension and compression chambers;

wherein a damping force of the suspension damper is a function of the air pressure input;

wherein the tapered interface provides a fluid tight seal.

* * * * *